Dec. 13, 1938.  P. M. CARTER  2,139,723

AUTOMOTIVE VEHICLE CONTROL MECHANISM

Original Filed Sept. 21, 1935   8 Sheets-Sheet 1

Fig. 1.

INVENTOR
Philip M. Carter
BY
Morgan, Finnegan and Durham
ATTORNEYS Dec. 13, 1938.     P. M. CARTER     2,139,723
AUTOMOTIVE VEHICLE CONTROL MECHANISM
Original Filed Sept. 21, 1935    8 Sheets-Sheet 3

Dec. 13, 1938.   P. M. CARTER   2,139,723
AUTOMOTIVE VEHICLE CONTROL MECHANISM
Original Filed Sept. 21, 1935   8 Sheets-Sheet 4

INVENTOR
Philip M. Carter
BY
Morgan, Finnegan and Durham
ATTORNEYS

Dec. 13, 1938.  P. M. CARTER  2,139,723
AUTOMOTIVE VEHICLE CONTROL MECHANISM
Original Filed Sept. 21, 1935   8 Sheets-Sheet 5

INVENTOR
Philip M. Carter
BY
Morgan, Finnegan and Durham
ATTORNEYS

Patented Dec. 13, 1938

2,139,723

UNITED STATES PATENT OFFICE 2,139,723

AUTOMOTIVE VEHICLE CONTROL MECHANISM

Philip M. Carter, White Plains, N. Y.

Application September 21, 1935, Serial No. 41,631
Renewed August 7, 1937

19 Claims. (Cl. 192—.01)

The present invention relates to automotive vehicles and more particularly to a novel and improved fluid pressure operated transmission gear shifting device for use with such vehicles.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:

Figure 7 is a similar view of the parts in reverse speed position;

The various figures under Figures 3, 4, 5, 6 and 7 and designated a, b, c, d, and e are sectional views taken on the section lines a—a, b—b, c—c, d—d and e—e of their respective figures.

The present invention has for its object the provision of a novel and improved fluid pressure operated gear shifting device particularly adapted for shifting the transmission gears in an automotive vehicle, as well as for the control and actuation of other parts of the automotive transmission system. Another object of the invention is the provision of a simplified form of vacuum-operated gear-shifting device which is substantially automatic in its operation but is provided with manual controls for supplementing or supplanting certain of the automatic operations. Still another object of the invention is the provision of a vacuum-operated gear-shifting mechanism which is reliable in its operation and can be constructed relatively inexpensively.

The present illustrative embodiment of the invention is particularly adapted for use in connection with the automotive transmission of the conventional sliding gear type having three forward and one reverse speeds, and is combined with an automatic vacuum-operated clutch connecting the transmission to an internal combustion engine furnishing the source of vacuum for the gear shifting device as well as for the clutch.

The vacuum-operated clutch is under control of the accelerator pedal or other engine throttle, and is adapted to be automatically disengaged when the throttle is closed, and is also provided with a separate manual control for silencing the automatic operation of the clutch and leaving the clutch manually operable, as by the usual clutch pedal.

The gear shifting device comprises a pair of double-ended cylinders, one mounted at either side of the transmission gear casing and having their pistons operatively connected with the slidable rods carrying the gear shifting forks within the transmission casing. Means are provided for accurately positioning the gear shifting rods in their various speed positions, and other means are provided for preventing movement of either rod when the other rod is not in neutral position. Clutch controlled means are provided for interrupting the supply of vacuum to the gear shifting device so that vacuum is applied thereto only when the clutch is disengaged, thereby preventing the clashing of gears and other faulty operation.

For selectively applying vacuum to the several ends of the gear shifting cylinders, a selector valve is provided which is moved from one position to another in accordance with vehicle speed under control of a governor driven from the vehicle propeller shaft, and this valve controls the application of vacuum in accordance with vehicle speed so that the gears are shifted to the proper transmission speed under control of the accelerator pedal or clutch pedal.

For preventing the opening of the engine throttle while the gears are being shifted, there is provided a vacuum-operated detent normally holding the accelerator pedal against movement, and released only when the suction is discontinued by the shifting of one or the other of the gear shifting rods to a gear meshing position.

Means are provided for optionally moving the main selector valve to second speed position whenever desired and regardless of the governor action tending to move it to some other position so that the operator is always enabled to shift the gears to second speed position. These means comprise a positive connection with the selector valve body, permitting movement of the body against springs in either direction, so that it is not necessary to overcome the action of the governor in shifting to second speed at a relatively high car speed.

Means are provided for controlling the application of vacuum to the cylinder by the position of the piston in the other cylinder so that movement of either piston is made dependent upon the other piston being in neutral position. Means are also provided for alternatively applying vacuum to either end of the first and reverse piston when the selector valve is in first speed position. The selector valve is movable under control of the governor so that it is positioned in accordance with vehicle speed and selectively connects one or the other of the cylinder ends to the source of vacuum while at the same time venting the other cylinder end of the same cylinder so as to permit unimpeded movement of the piston.

For permitting the operator to shift the gears to a particular position, for instance, second speed, regardless of vehicle speed, resilient connecting means are provided between the selector valve and its operating governor, permitting limited movement of the valve independently of the governor, and control means are positioned conveniently so that the operator can move the selector valve to a speed position other than its normal position as determined by vehicle speed.

Means are also provided for returning the selector valve to a particular speed position, such as neutral, each time the vehicle is brought to a stop, and for moving the selector valve to first speed position as the clutch pedal is depressed. These means also permit the return of the valve to neutral position as the clutch pedal is released, at the same time holding the valve in first speed position if the clutch is fully engaged while the foot is depressing the accelerator pedal.

A second speed lock is provided preventing movement of the selector valve directly from first to third speed position without actuation of the clutch pedal, thereby preventing the gears being shifted directly from first to third speed position automatically. Other means are provided for rendering the automatic clutch normally inoperative in high speed position, so as to give compression in high speed, while at the same time permitting the normal operation of the automatic clutch whenever the vehicle speed drops below a predetermined minimum.

It will be understood that the foregoing general description and the following detailed description as well are exemplary and explanatory of the invention but are not restrictive thereof.

Referring now in detail to the illustrative embodiment of the invention as shown in the accompanying drawings, the source of vacuum is the intake manifold 20 of the automotive internal combustion engine, and this engine is connected to the propeller shaft of the vehicle through a clutch 19, transmission 21 and universal joint 22, all of conventional construction. The invention is illustrated in connection with a transmission of the selective, sliding gear type having neutral, three forward and one reverse speed positions. The clutch is adapted to be operated by means of the clutch pedal 24 or alternatively by the piston 26 of a vacuum-operated power cylinder against the pressure of clutch engaging springs 25, while the supply of fuel to the engine is regulated by means of an accelerator pedal 27 connected to the throttle 28 by means of rod 29, and normally returned to idling position by spring 23, all in the usual manner. The application of vacuum to the automatic clutch operating means is preferably under control of the accelerator pedal, as well as under the control of an independently operable manually controlled valve. As embodied, there is provided a main vacuum line 30, provided with a shut-off valve 29, connected to the vacuum clutch line 31 which is connected to the end of cylinder 32, and a manually operated slide valve 33 is interposed in this line 31. Another slide valve 34 is also interposed in vacuum line 31 and is so positioned and connected to the accelerator pedal 27 that the valve 34 is open when the accelerator pedal is fully released and the throttle is in idling position. A vent line 36 is also connected to the end of cylinder 32 and to valve 34, so that as the accelerator is depressed to open the throttle, the application of vacuum through line 31 is interrupted and cylinder 32 is vented to atmosphere through line 36. Clutch operating piston 26 is connected to the clutch pedal 24 by suitable linkage 38.

The transmission comprises a gear casing 50 provided with a cover plate 51, and the various shafts, gears, synchronizing mechanism and other parts of the transmission are mounted within the casing 50 and are covered by the plate 51. For shifting the gears to their various speed positions, there are provided gear shifting rods 53 and 54, slidably mounted in the casing 50 and carrying gear shifting forks (not shown) which are connected to the shiftable gears in the usual manner. Shifting rod 53 serves to shift the gears from neutral to reverse or first speed position, while shifting rod 54 serves to shift the gears from neutral to second or third speed position. Shifting rods 53 and 54 are notched, as at 56, corresponding to their several positions and cooperate with the spring pressed detents 57 seated in one end wall of the transmission casing 50, these detents serving to assist in the accurate positioning of the slide rods 53 and 54. An interlock 58, comprising a short plunger is slidably mounted in the web 60 between rods 53 and 54, the rounded ends of the plunger engaging in depressions 61 formed in the sides of rods 53 and 54, and plunger 58 being of such a size that it prevents movement of either rod 53 or 54 when the other rod is not in neutral position.

Fluid pressure means are provided for reciprocating the shifting rods 53 and 54, and one vacuum cylinder is provided for each of said rods. As embodied a double-ended cylinder 70, formed integrally with the cover plate 51, is mounted at one side of the casing 50 and within this cylinder is reciprocably mounted the double-ended piston 71 carried by its piston rod 72. At one end piston rod 72 is cut away to provide a slot 73 into which is fitted the rounded end 74 of a lever 75 pivotally mounted on pin 76 projecting upwardly from and secured to the cover 51, the other end of lever 75 being forked as at 77 to fit over a pin 78 secured to the shifting rod 53.

At the other side of the transmission casing 50, and for operating the other shifting rod 54, there is provided a generally similar cylinder 80 in which is reciprocably mounted a piston 81 carried by its piston rod 82, which is connected at one end to lever 84 on pin 85 and connected to slide rod 54 by means of the lever's forked end 86 and pin 87.

The pistons 71 and 81 are preferably formed of leather cups with a backing plate 89 positioned between them and expanders 90 may be seated within the cups to insure close contact of the leather with the walls of the cylinder. The piston rods 72 and 82 are accurately cylindrical and are closely fitted within the glands 92, 93, 94 and 95 at the ends of the cylinders.

Pistons 71 and 81 are moved by vacuum applied to one side or the other of one of the pistons, which application of vacuum is under control of the clutch as well as under control of the main selector valve, and the source of vacuum is preferably the intake manifold 20 of the internal combustion engine used for driving the automotive vehicle.

The main vacuum line 30 is also connected with a vacuum line 100 connected to line 101 through valve 102. Vacuum line 101 is forked, one branch 103 being connected to the selector valve at 104, and the other branch 105 serving to control the accelerator pedal 27.

Valve 102 comprises a cylindrical valve body within which is slidable a valve slide 107 formed with a valving groove 108 and a venting slot 109. Valve slide 107 is normally held in the position shown in Figure 1 and is moved inwardly of the valve 102 against the compression of spring 110. In the position shown, line 101 is vented through slot 109 and aperture 111 formed in the closed end of the valve body, while in its outer position groove 108 connects lines 100 and 101. A crosshead 112 fixed to the end of the clutch cylinder operating piston rod 113 projects sufficiently far to contact with the end of slide 107 to open valve 102 when suction is applied to cylinder 32 and the clutch is disengaged. In this condition, vacuum is applied to line 101.

For controlling the accelerator pedal and preventing opening of the throttle while the gears are shifted and at all times except when the gears are fully meshed in one or the other of their several speed positions, the link 120, connecting accelerator pedal 27 with the clutch-controlling valve 34, is provided with a tooth 121 adapted to be engaged by finger 122 formed at the end of rod 123, and rod 123 is moved into locking and free positions by means of fluid pressure operated motor 124 having a resilient metallic diaphragm 125 which is moved to locking position by vacuum applied through line 126. The suction applied to the diaphragm 124 raises finger 122 into position to block tooth 121 and prevent movement of the accelerator pedal 27, while relieving the suction, lowers finger 122, thereby freeing the accelerator pedal.

Line 126 is connected to the double valve 127 positioned immediately above the shifter rods 53 and 54. Valve 127 comprises a passageway 129 formed in block 128 and extending from line 126 to line 105, and closed by the valve slides 127a and 127b. Each slide is formed with a groove 127c so that in its raised position lines 105 and 126 communicate with each other. The lower ends of slides 127a and 127b fit into depressions 53a formed in slide rods 53 and 54, and there is one such depression for each of the several speed positions of each of slide rods 53 and 54. Compression springs 127d serve to force the slides 127a and 127b into these respective depressions. When one or the other of slide rods 53 and 54 is in neutral position and the other slide rod is in neutral position or is moving to a speed position, the two grooves 127c register with the passageway 129, thereby applying vacuum from line 105 to 126 and serving to actuate the diaphragm 124 and finger 122.

The application of vacuum selectively to the vacuum cylinders is controlled by a slidable selector valve which is moved from one position to another by and under control of a governor actuated upon the vehicle exceeding a predetermined low speed. As embodied, the selector valve comprises a slidable valve member mounted within a valve seat formed as a part of the transmission cover plate 51, and controlling the application of vacuum from the main vacuum line 101 to the several sides of the pistons 71 and 81. The slidable valve member comprises a hollow tubular member 130, within which is a rod 131 rigidly connected to a screw plug 132 closing one end of the member 130, and rod 131 is tightly, yet slidably, fitted within the portion 133 of reduced bore so as to render this portion air tight. Between the headed end 131' of rod 131 and the end of member 130 is a compression spring 134.

On its exterior, member 130 is provided with a plurality of grooves and valve openings which will be described more in detail in connection with the operation of the mechanism, and these openings are variously positioned circumferentially of the valve body so as to contact with similarly positioned valve ports in the valve body. The valve body 135 comprises a tubular boss on the cover 51, the internal diameter of which corresponds to the diameter of the valve member 130.

Valve body 135 at one side is provided with a main port 136 connected to vacuum line 103 by means of a suitable fitting 137, and port 136 is always in communication with the valve groove 139 and communicates with an aperture 140 leading into the hollow interior of the valve member 130.

Vacuum is applied from the selector valve to the four cylinder ends through various ducts formed in the metal of the cover plate 51, as follows:

To the rear side of cylinder 80, corresponding to high speed position, by means of duct 150 leading from the cylinder end to the valve port 151;

To the forward end of cylinder 80, corresponding to second speed position, by means of duct 152, leading from the front end of cylinder 80 to a valve formed in gland 95, and from gland 95 to port 154;

To the rear end of cylinder 70, corresponding to first speed position, by means of duct 155, to a reversing valve, through duct 156, to a valve in gland 93, and then through duct 157 to port 158;

To the forward end of cylinder 70, corresponding to reverse position by means of duct 159, through the reversing valve, through duct 156 to a valve in gland 93 and then through duct 157 to port 158.

Vacuum may also be applied to the central portion of the cylinders so as to move the pistons to neutral position and for this purpose is applied through the selector valve from port 160' to ducts 160 and 161 to cylinder ports 162 and 163 positioned midway of their respective cylinders, and spaced therealong so that movement of the pistons to neutral position gradually cuts off the ports slowing the piston as it approaches its central position.

Venting of the cylinders is accomplished through the selector valve for all forward speeds as will be clear from a description of this valve, while in reverse, the first speed cylinder is vented through duct 155 and vent 192 as will be clear from the description of the reversing valve.

In all positions of the selector valve vacuum is applied to its hollow interior, between slide rod 131 and the valve body 133, through line 103, port 136, valve groove 139 and the communicating aperture 140.

The selector valve in its various positions is shown in Figures 3, 4, 5, 6, and 7 and the various figures subsidiary thereto, the subsidiary figures being fragmentary sectional views through the selector valve at those points corresponding to its various operative ports.

Figure 3:
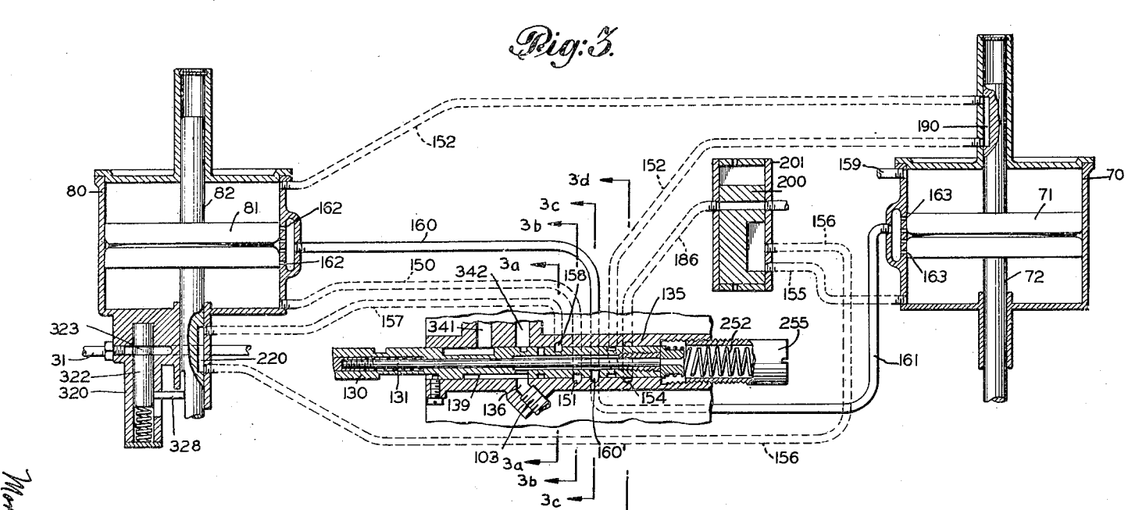
Figure 3 is a diagrammatic view showing the position of the various vacuum operated parts and selector valve for shifting the transmission gears into neutral.
Figure 3A:
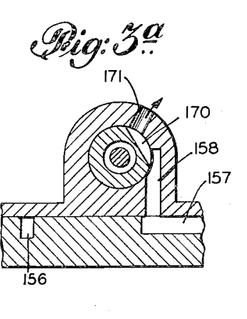
Figure 3B:
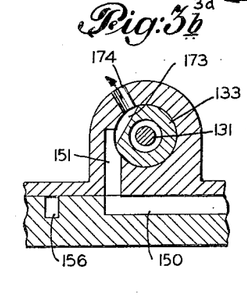

Figure 3 shows the selector valve in neutral position, where it is adapted to apply suction to the central portion of both cylinders 70 and 80 to return both pistons to their central or neutral position. As shown, the selector valve body is at its extreme left position.

Figure 3C:
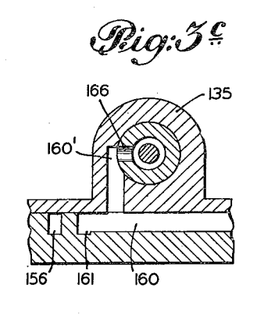
Figure 3D:
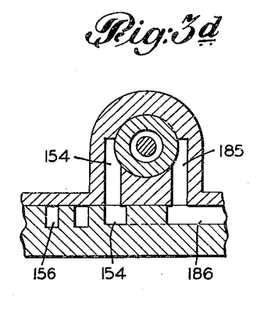

In this position, vacuum is applied from the hollow interior of the valve through port 166 to port 160' to ducts 160 and duct 161 as shown in Figure 3c, while the first speed line 157 is vented to atmosphere through the port 158 and the channel port 170 which communicates to atmosphere through vent port 171. The high speed cylinder is vented through duct 150, port 151, channel port 173 and venting port 174.

Figure 4:
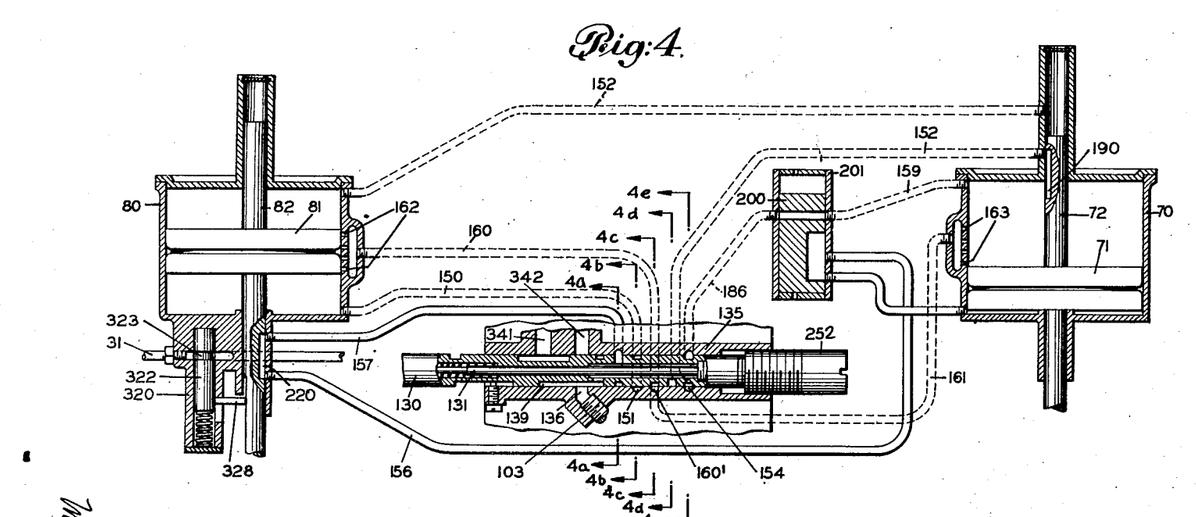
Figure 4 is a similar view with the parts in first speed position.
Figures 4A, 4B:
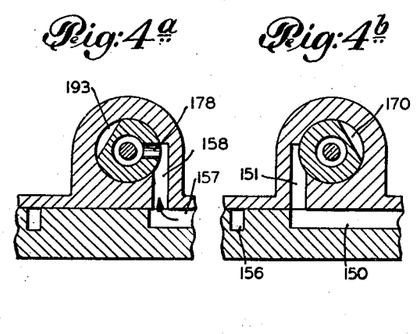
Figures 4C, 4D:
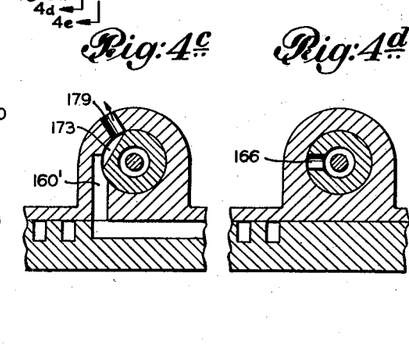
Figure 4E:
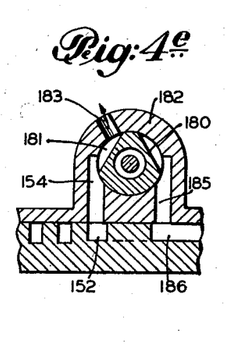

Figure 4 and its subsidiary figures show the selector valve as moved to first speed position. In this position, vacuum is applied to the rear face of piston 71 through ducts 155, 156, and 157 communicating with port 158 which is then positioned opposite the valve port 178 communicating with the interior of the hollow portion of the valve body.

The channel port 170 is sealed by the valve body wall, while the channel port 173 vents the neutral lines 160 and 161 through venting port 179. Port 166 is also sealed by the body wall, and the channel ports 180 and 181, communicating with atmospheric ports 182 and 183 vent the reverse and second speed ducts and cylinders. Channel port 180 is connected through port 185 to duct 186 which is connected through the reversing valve to duct 159 in all forward speed positions.

Figure 5:
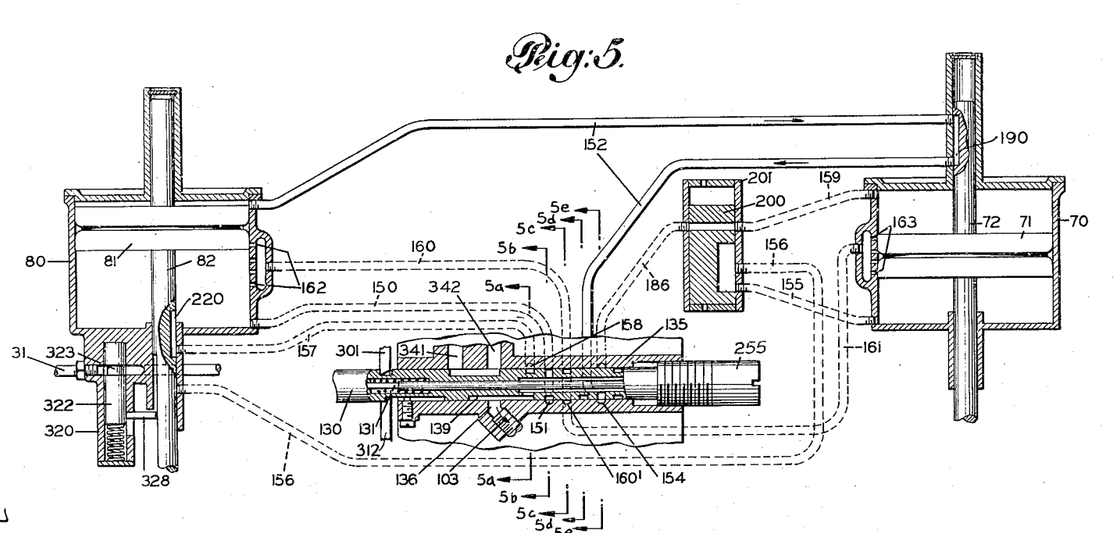
Figure 5 is a similar view with the parts in position to shift the gears into second speed position.
Figure 5A:
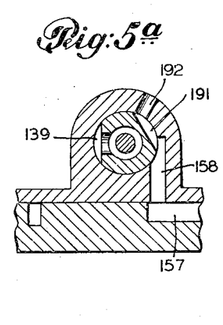

Figure 5 and its subsidiary figures show the selector valve as moved to second speed position. In this position, vacuum is applied to the forward face of piston 71 through duct 152 communicating with the channel port 190 in piston rod 72 where it passes through gland 95, and this suction is continued until the piston 71 is returned to its central or neutral position, after which the channel port 190 connects the vacuum duct 152 to the remainder of this duct and applies vacuum to the forward face of the piston 81 moving this piston towards the front of the device and shifting the gears into second speed position. With the valve in this position vacuum is applied to duct 152 from the hollow interior of the selector valve, through valve ports 154 and 166 as shown in Figure 5e.

Figure 5B:
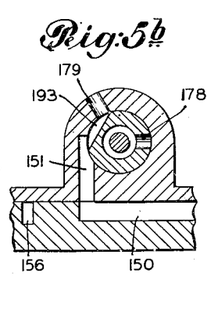
Figure 5C:
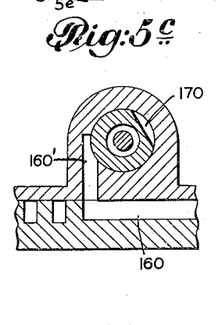
Figure 5D:
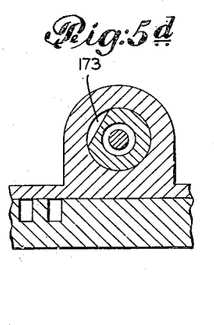
Figure 5E:
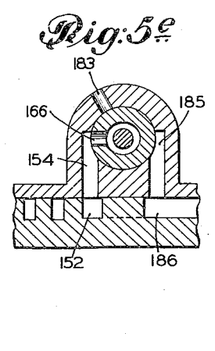

The first speed duct 157 is vented to atmosphere through port 158, valve port 191 and vent 192, while the high speed cylinder end is vented through duct 150, duct 151, venting aperture 179 and the channel port 193, as shown in Figure 5b. The neutral ducts 160 and 161 are sealed as shown in Figure 5c, and channel port 173 is idle.

Figure 6:
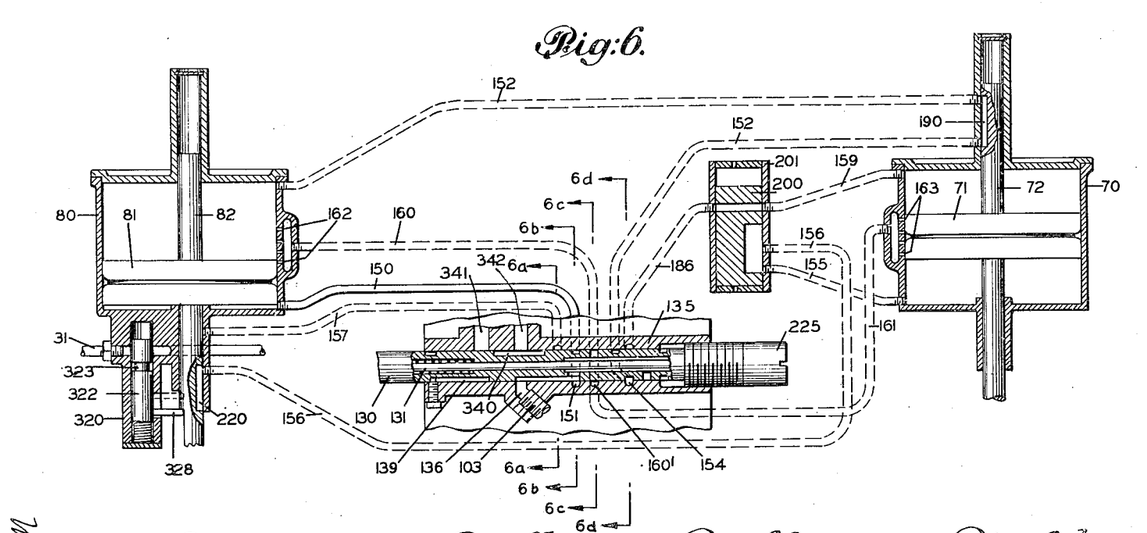
Figure 6 is a similar view with the parts in high speed position.
Figure 6A:
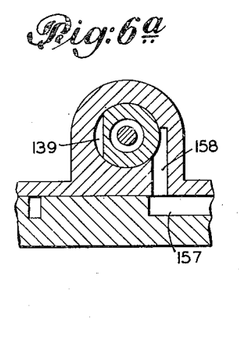
Figure 6B:
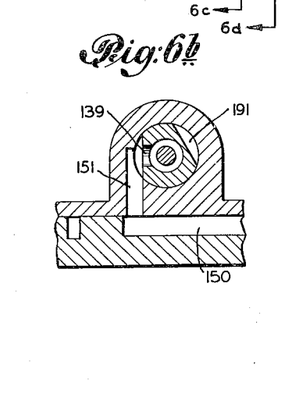
Figure 6C:
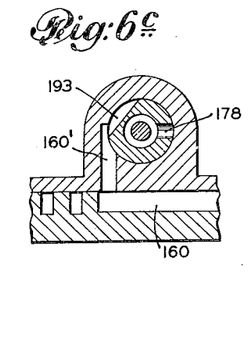
Figure 6D:
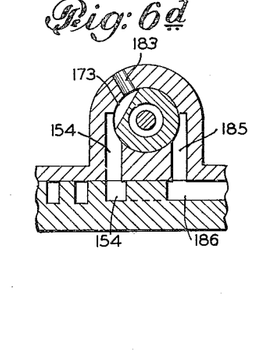
Figure 7A:
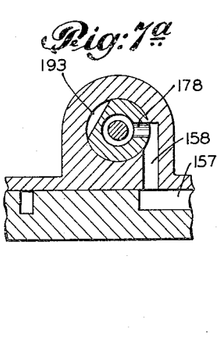
Figure 7B:
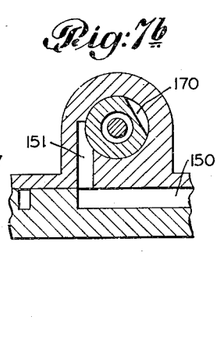
Figure 7C:
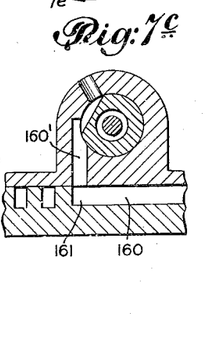
Figure 7D:
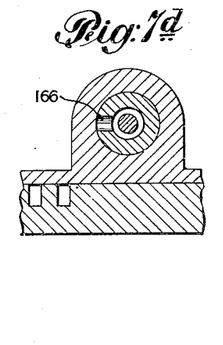
Figure 7E:
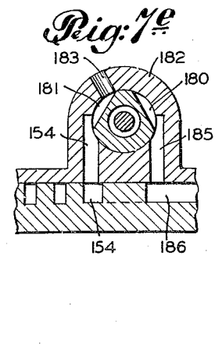

Figure 6 and its subsidiary figures show the selector valve as moved to third speed position. Vacuum is here applied to the rear face of the piston 81 moving this piston rearwardly of its cylinder to shift the gears into third speed position. The application of this vacuum is so effected through duct 150, which communicates with valve port 151 opposite which is then positioned the long, main vacuum supply groove 139 in the valve body.

The first speed valve port 158 is sealed against the valve slide, while ports 160', 178 and 193 are also sealed preventing application of vacuum through the neutral ducts 160. The second speed port 154 is vented to atmosphere through channel duct 173 and port 183, while reverse duct 186 is sealed.

Figures 8, 9, 10, 11, 12, 13, 14:
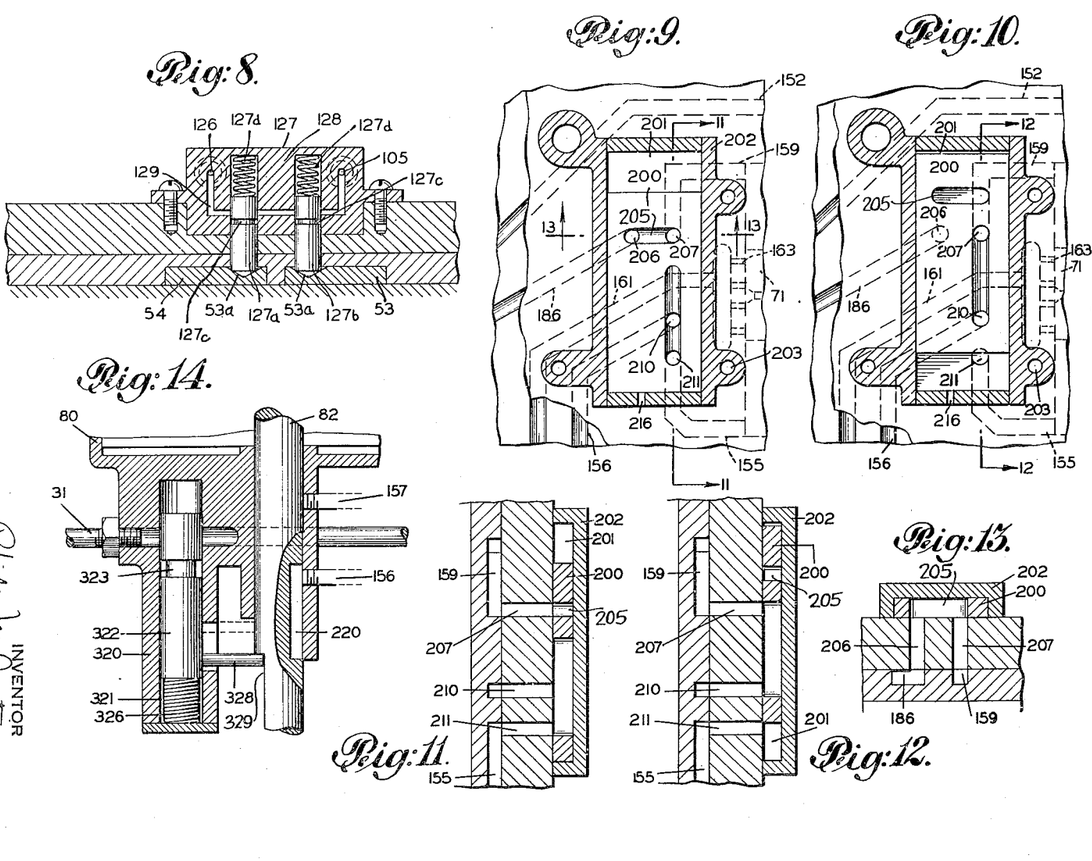
Figure 8 is a section view taken on the line 8—8 of Figure 1.
Figures 9 and 10 are detail horizontal sectional views of the reversing valve in forward and reverse positions respectively.
Figures 11 and 12 are fragmentary sectional views taken on the lines 11—11 and 12—12 on Figs. 9 and 10 respectively.
Figure 13 is a section taken on the line 13—13 of Fig. 9.
Figure 14 is a fragmentary sectional view of the third speed by-pass control valve.

The reverse position of the selector valve and reversing valve is shown by Figure 7 and its subsidiary figures and by Figure 10. The selector valve in this position is in exactly the same relation to the various valve ports and ducts as in first speed (Figure 4), but the vacuum is applied to the reverse side of piston 71 rather than to the first speed side due to the action of the reversing valve.

The reversing valve comprises a rectangular valve slide 200 which can be moved back and forth over a flat valve seat 201 formed as a part of the cover plate 51, and the slide 200 is held thereagainst and guided in its back and forth movement by means of a cover 202 secured to the cover 51 by screws passing through holes 203. Slide 200 is provided with a transverse slot 205 adapted to connect the end 206 of duct 186 with the end 207 of duct 159 in the forward speed position of the valve, and is also provided with a longitudinal slot which also at the same time connects the end 210 of duct 156 with end 211 of duct 155. In the position shown in Figure 9, the valve provides for the application of vacuum to first speed and for the venting of the reverse speed side of piston 71.

The reversing valve slide 200 may be moved to reverse speed position (Figure 10) by means of a manually operable push wire control 215, controlled from the dash panel, and in reverse position connects the first speed duct 156 with the end 207 of the reverse speed duct 159 to apply suction to the reverse side of piston 71, at the same time exposing the end 211 of duct 155 and venting the first speed side of piston 71 to atmosphere through the aperture 216 in cover frame 202. In reverse position the end 206 of duct 186 is sealed.

The respective positions of the various selector valve ports need not be again described in detail as these are the same as in Figure 4 and the subsidiary figures under Figure 7 correspond to the similarly identified figures under Figure 4.

In shifting the gears from second speed to first speed position, the selector valve is positioned in first speed position, and vacuum is applied from the selector valve to the first speed duct 157 and serves to return the piston 81 to neutral position through the piston rod port 220. As the piston reaches neutral position, this port is shut off and simultaneously vacuum is applied to duct 156 through port 220 thereby applying the vacuum to the first speed position of piston 71 exactly the same as described in connection with Figure 4.

In bringing the automobile to a stop, the selector valve is returned to neutral position. On disengaging the clutch, the valve is moved to first speed position, shifting the gears to first speed and if the accelerator is depressed while engaging the clutch, the vehicle moves, causing the governor to hold the valve away from neutral position.

Figure 1:
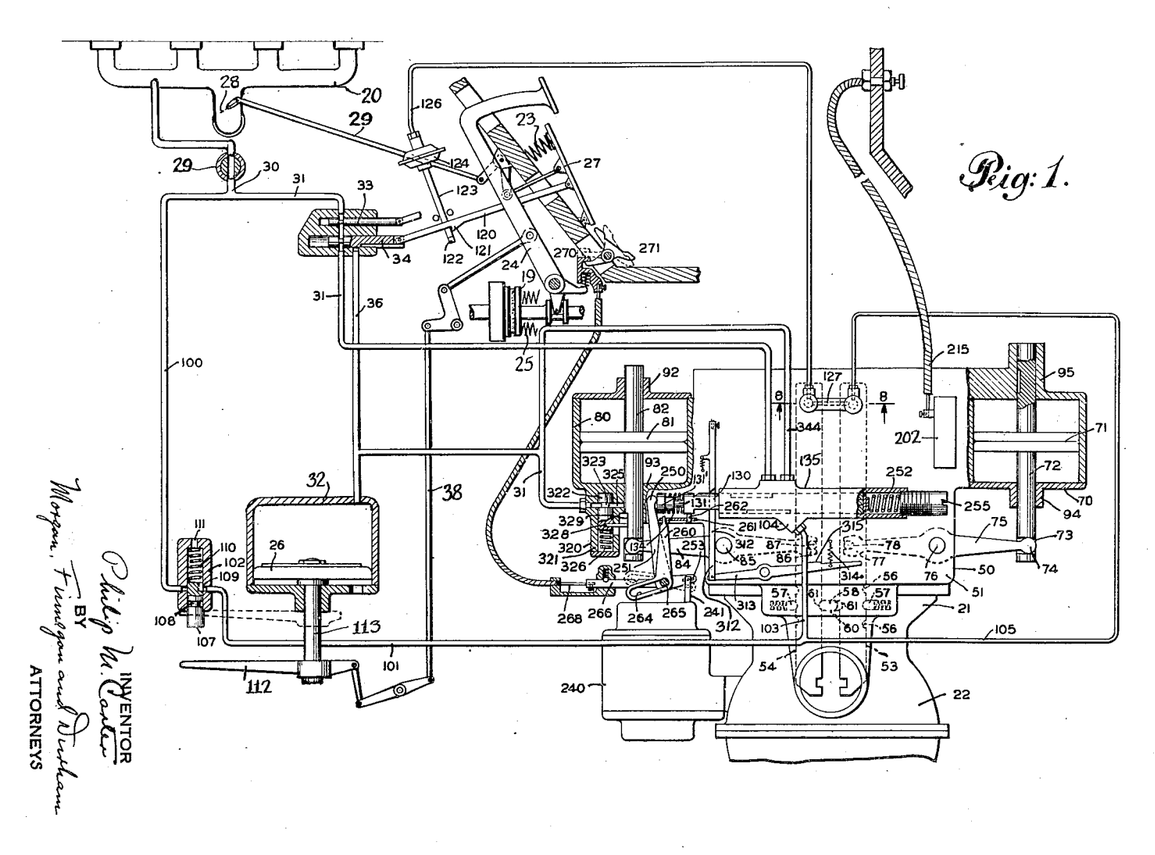
Figure 1 is a schematic view, with certain parts shown in section, of an illustrative vacuum-operated gear shifter and associated control devices constructed in accordance with the present invention.

Means are provided for optionally moving the selector valve to second speed position at any time during the running of the vehicle or even while the vehicle is stationary, thereby giving the operator better control of the vehicle and permitting him to cope with grade or traffic conditions as completely as though a manually operable gear shifting device were employed. These means permit movement of the valve independently of the action of the governor on the valve. As embodied, the governor 240 comprises a centrifugal governor of the fly-ball or other suitable type which is driven from the propeller shaft through gearing within the universal housing 22, and is thus driven proportionally to vehicle speed. Governor 240 is provided with a projecting link 241 which is retracted by increased speed of the governor, and serves to connect the governor to the selector valve actuating means. The headed end 131' of the selector valve push rod 131 rests against the rounded end 250 of bell crank arm 251 and is urged towards the bell crank by spring 134 and a main spring 252 bearing against the other end of the valve push rod 131 and tending always to return the selector valve to its initial position, as shown in Figure 1. Bell crank 251 is pivotally mounted about a pivot pin (not shown) and its other arm is connected to the governor link 241 by means of a pin and slot connection 253, so that the greater the force exerted by the governor, the more the selector valve body 130 is moved to the right against the compression of spring 252. Means are provided for varying the pressure of spring 252 and for this purpose the spring is contained within the hollow interior of a threaded plug 255 threaded into the end of the valve casing 135.

A second bell crank 260 is pivoted coaxially with bell crank 251 and is independently movable with respect thereto and has its longer arm connected by link 261 to a pin 262 extending laterally from the selector valve body 130, and has its other end provided with a long radial slot 264 in which slides a pin 265 carried on the end of plunger 266, so that as the plunger is retracted, the selector valve body 130 is moved to second speed position. In moving the selector valve from a low speed to second speed position, pin 265 moves the valve against the compression of spring 252, while in moving the valve body from high speed position to second speed position, the valve body alone is moved against the compression of spring 134, while the valve push rod 131 remains held in high speed position due to the force exerted by the governor.

Any suitable means may be provided for moving the pin 265 to and from its second speed position, but these means are preferably associated with the means provided for moving the selector valve from neutral to first speed position, or vice versa. As embodied, plunger 266 is connected to a push wire control 268 which in turn is connected to a member 270 having limited movement with respect to a small treadle 271 which may be positioned adjacent to the accelerator pedal 27, and in one position (shown as dotted) moves the plunger 266 to second speed position. The member 270 is also adapted to be similarly moved, although to a lesser extent by the depression of the clutch pedal 24, and when so moved, moves the selector valve from neutral to first speed position in the present embodiment.

Thus in starting the vehicle, the gears are normally in neutral position while the vehicle is at rest. The operator depresses the clutch pedal, disengaging the clutch, simultaneously moving the selector valve to first speed position and also applying vacuum to the shifter to set the gears in first speed position. Then as the operator engages the clutch while depressing the accelerator pedal, the vehicle is set in motion and the main control valve is closed and the selector valve is held in first speed position and then moved to second speed position by operation of the rotating governor.

Means are also provided for releasably locking the selector valve in second speed position while the vehicle is accelerating or decelerating, thereby preventing the operator unintentionally going from first to third speed without meshing the gears in second speed position. As embodied, the selector valve body 130 is formed with a notch 300 near its left hand end, and a latch 301 is resiliently urged towards and into the notch by spring 302, while the latch slides on screws 303 and is moved away from the notch 300 by pull wire control 304.

Figures 2, 15:
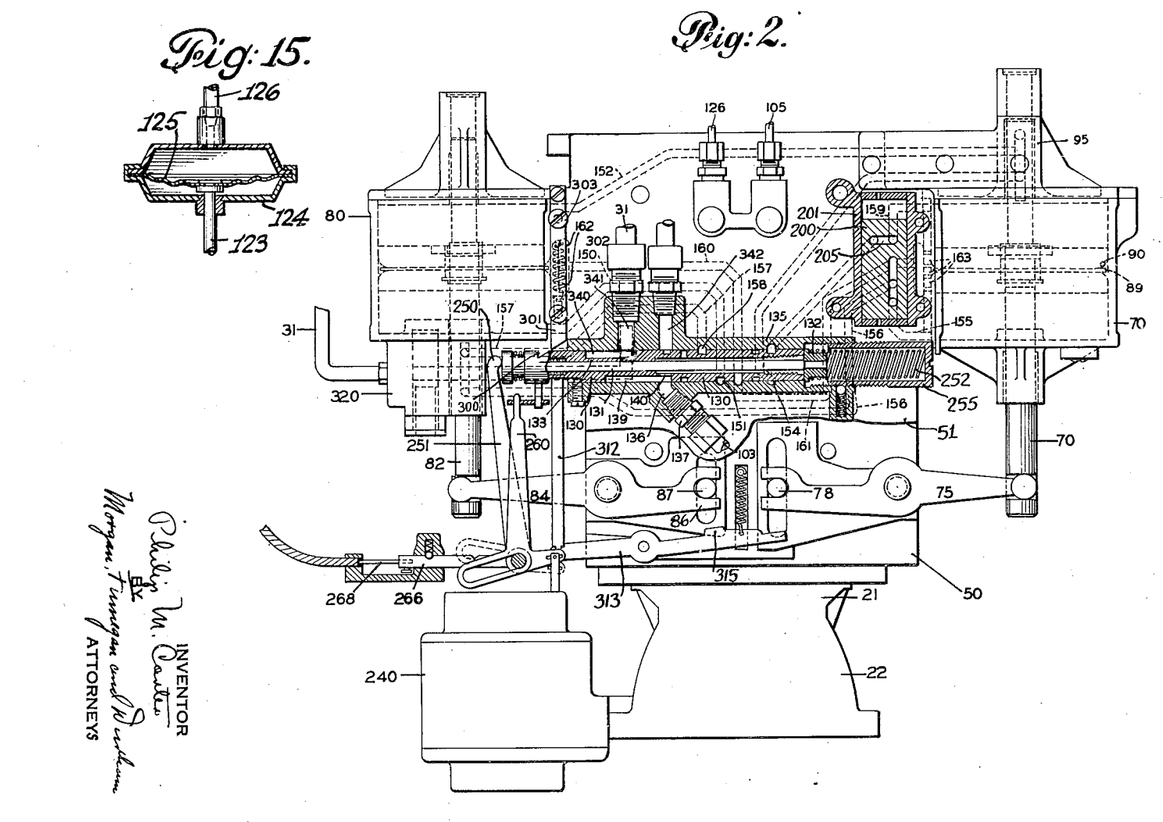
Figure 2 is a plan view of the gear shifting device shown in Figure 1, certain parts being shown in section.
Figure 15 is a detailed sectional view of the fluid pressure operated motor for the throttle control.

The notch engaging end of latch 301 is beveled so as to positively engage and hold the valve in accelerating movement only, while the beveled face resiliently opposes movement of the valve to neutral or first speed position on deceleration. For this purpose, the latch 301 is formed with an extension 312 connected to the end of a lever 313 pivotally mounted on the cover plate 51 and resiliently held in its normal position (Figure 2) by means of a spring 314. Lever 312 is formed with a boss 315 adapted to be engaged by the forked end 86 of lever 84, so that as the gears are shifted into second speed position, the latch 301 is withdrawn, permitting the valve to assume whatever position corresponds to the vehicle speed.

Means are also provided for automatically silencing the automatic clutch operation under certain conditions, and as embodied, the vacuum line applying vacuum to the automatic clutch is closed when the vehicle is travelling in excess of a predetermined speed and is in high gear. Thus at normal driving speeds on the highway, the automatic clutch operation is rendered inoperative and the braking force of the engine compression is available, while the automatic clutch is automatically made available under all conditions when it would be desirable or necessary to shift gears. As embodied, a cut-off valve 320 is interposed in the main vacuum clutch line 31 and this valve is positioned at the high speed end of cylinder 80. Valve 320 comprises a valve body

321 and a plunger 322 having an annular groove 323 adapted to connect line 31 with the duct 325 in the cover 51. Plunger 322 is normally held in valve open position by means of spring 326 and is moved to closed position when the piston 81 is in high speed position through pin 328 projecting laterally from the valve plunger 322 and passing through a slot in the side wall of the valve body and projecting into a slot 329 at the end of piston rod 82, thereby permitting lost motion between the piston and valve plunger, and moving the plunger to valve-closing position only when the piston is fully moved to high speed position.

Means are provided for supplying vacuum to the automatic clutch cylinder 32 through a by-pass line when the vehicle is moving in high gear and its speed is less than the predetermined speed, and for this purpose a by-pass valve is provided on the selector valve for connecting the vacuum clutch with the main vacuum clutch supply line under these conditions. As embodied, the selector valve is provided with a channel port 340 adapted to connect valve port 341 (which communicates with duct 325 and line 31) to port 342 which is connected to the by-pass vacuum line 344 which is also connected to the vacuum cylinder end of line 31. Thus when the selector valve slide 130 is moved to third speed position these ports 341 and 342 are interconnected and the automatic clutch is operative, while as the vehicle speed is still further increased, the slide 130 is moved further to the right, as shown in Figure 6, and cuts off the vacuum which would otherwise be applied to the vacuum cylinder 32 and thereby renders the automatic clutch inoperative, until the vehicle speed is sufficiently reduced to connect ports 341 and 342 through channel port 340.

The invention in its broader aspects is not limited to the specific mechanisms shown and described but departures may be made therefrom within the scope of the accompanying claims without departing from the principles of the invention and without sacrificing its chief advantages.

What I claim is:

1. In an automotive vehicle having an internal combustion engine, a clutch and a shiftable gear transmission the combination of fluid pressure means for shifting the transmission gears from one speed to another, a movable selector valve controlling the application of fluid pressure to said means, means for returning the selector valve to a predetermined position on stopping the vehicle and means operated by operation of the clutch for moving the selector valve to another predetermined position in starting the vehicle.

2. In an automotive vehicle having an internal combustion engine, a clutch and a shiftable gear transmission the combination of fluid pressure means for shifting the transmission gears from one speed to another, a selector valve moved when the vehicle speed exceeds a predetermined minimum and controlling the application of fluid pressure to the shifting means, means for returning the selector valve to a predetermined position on stopping the vehicle and means operated by operation of the clutch for moving the selector valve to first speed position.

3. In an automotive vehicle having an internal combustion engine, a clutch and a shiftable gear transmission, the combination of fluid pressure means for shifting the transmission gears from one speed to another, a selector valve moved when the vehicle speed exceeds a predetermined minimum and controlling the application of fluid pressure to said means, said valve having a plurality of positions corresponding to different transmission gear ratios, means for returning the valve to neutral position, and means operated by operation of the clutch for moving the valve to first speed position.

4. In an automotive vehicle having an internal combustion engine, a clutch and a shiftable gear transmission, the combination of fluid pressure means for shifting the transmission gears from one speed to another, a selector valve moved when the vehicle speed exceeds a predetermined minimum and controlling the application of fluid pressure to said means, said valve having a plurality of positions corresponding to different transmission gear ratios, means for returning the valve to a predetermined position against its moving means, manual means for moving the valve from its normal position to first speed position and other means for moving said valve to second speed position.

5. In an automotive vehicle having an internal combustion engine, a clutch and a shiftable gear transmission, the combination of fluid pressure means for shifting the transmission gears from one speed to another, a selector valve moved when the vehicle speed exceeds a predetermined minimum and controlling the application of fluid pressure to said means, said valve having a plurality of positions corresponding to different transmission gear ratios, means for returning the valve to a predetermined position on stopping the vehicle, means operated by operation of the clutch for moving the valve to a low speed position and other means for moving the valve to an intermediate speed position.

6. In an automotive vehicle having an internal combustion engine, a clutch and a shiftable gear transmission the combination of fluid pressure means for shifting the transmission gears from one speed to another, a movable selector valve controlling the application of fluid pressure to said means, means for returning the selector valve to a predetermined position on stopping the vehicle and means operated by operation of the clutch for moving the selector valve to another predetermined position in starting the vehicle and means released by operation of the clutch for holding the selector valve in an intermediate speed position.

7. In an automotive vehicle having an internal combustion engine, a clutch and a shiftable gear transmission, the combination of fluid pressure means for shifting the transmission gears from one speed to another, a selector valve moved when the vehicle speed exceeds a predetermined minimum and controlling the application of fluid pressure to said means, said valve having a plurality of positions corresponding to different transmission gear ratios, means for returning the valve to a predetermined position on stopping the vehicle, means operated by operation of the clutch for moving the valve to a low speed position, other means for moving the valve to an intermediate speed position and means released by operation of the clutch for holding the selector valve in an intermediate speed position.

8. In an automotive vehicle having an engine, a clutch and a selective gear transmission, the combination of means for shifting the transmission gears from one speed ratio to another, selector means controlling the shifting of said gears, means for returning said selector means to a predetermined position on stopping the vehicle and means operated by the clutch operation for moving said selector to a low speed position.

9. In an automotive vehicle having an engine, a clutch and a selective gear transmission, the combination of means for shifting the transmission gears from one speed ratio to another, selector means controlling the shifting of said gears, means for returning said selector means to a predetermined position on stopping the vehicle and means operated by the clutch operation for moving the selector to a low speed position, other means for moving the selector to an intermediate speed position.

10. In an automotive vehicle having an engine, a clutch and a selective gear transmission, the combination of means for shifting the transmission gears from one speed ratio to another, selector means controlling the shifting of said gears, means for returning said selector means to a predetermined position on stopping the vehicle, means operated by the clutch operation for moving said selector to a low speed position, and means released by clutch operation for locking the selector against movement from intermediate to high speed position.

11. In an automotive vehicle having an engine, a clutch and a selective gear transmission, the combination of means for shifting the transmission gears from one speed ratio to another, selector means controlling the shifting of said gears, means for returning said selector means to a predetermined position on stopping the vehicle, means operated by the clutch operation for moving the selector to a low speed position, other means for moving the selector to an intermediate speed position and means released by clutch operation for locking the selector against movement from intermediate to high speed position.

12. In an automotive vehicle the combination of an internal combustion engine, a clutch, a shiftable gear transmission having a plurality of shift rods, throttle means controlling the supply of fuel to the engine, vacuum operated means for shifting the transmission gears from one speed to another, a vacuum operated diaphragm for locking the throttle in idling position, a valve operated by each shift rod and closed only when the rod is in fully meshed position, said valves being in series between the diaphragm and source of vacuum.

13. In an automotive vehicle, the combination of an internal combustion engine, a clutch, fluid pressure means for operating the clutch, an accelerator pedal controlling the supply of fuel to the engine and the application of fluid pressure to the clutch operating means, a shiftable gear transmission, fluid pressure means for shifting said gears, a selector valve controlling the application of fluid pressure to the shifting means, means operated when the vehicle speed exceeds a predetermined minimum for moving said valve, means operated by shifting of the gears into certain position for preventing fluid pressure operation of the clutch and a by-pass line through which and the selector valve fluid pressure is applied to the clutch operating means in certain positions of the selector valve.

14. In a fluid pressure operated gear shifter, a cylinder having a piston therein, a selector valve controlling the application of fluid pressure to the cylinder, a valve controlling a separate fluid pressure operated device and closed by the piston in one position and a by-pass line around said second valve and connected through the selector valve for controlling the application of fluid pressure when said second valve is closed.

15. In a fluid pressure operated gear shifter, a selector valve having different speed positions, power means for moving said selector from one position to another, a flexible connection connected to said selector, means for moving said selector to a particular position and other means for moving said selector to another position from its particular position.

16. In a fluid pressure operated gear shifter, a selector valve having different speed positions, power means for moving said selector from one position to another, a resilient connection between said power means and selector, a bell crank connected to said selector, a slot in one arm of the bell crank and a manually reciprocable pin movable in said slot.

17. In an automotive vehicle having an engine, clutch, control means therefor, and shiftable gear transmission, the combination of fluid pressure operated means for shifting the transmission gears from one speed to another, a selector mechanism having different positions corresponding to different speed ratios and including fluid pressure controlling valves, a governor operating in accordance with the vehicle speed for moving the selector between its higher speed positions, and other means for controlling the movement of the selector to a low speed position.

18. In an automotive vehicle having an engine, clutch, control means therefor, and shiftable gear transmission, the combination of fluid pressure operated means for shifting the transmission gears from one speed to another, a selector mechanism having different positions corresponding to different speed ratios, and including fluid pressure controlling valves, means for moving the selector to a low speed position upon declutching of the clutch, and a governor operating in accordance with the vehicle speed for controlling the movement of the selector between higher speed positions.

19. In an automotive vehicle having an engine, clutch, control means therefor, and shiftable gear transmission, the combination of fluid pressure operated means for shifting the transmission gears from one speed to another, a selector mechanism having different positions corresponding to different speed ratios and including fluid pressure controlling valves, means for moving the selector to a low speed position upon declutching of the clutch, a governor operating in accordance with the vehicle speed for controlling the movement of the selector between higher speed positions, and means for controlling the governor movement of the selector by the clutch control means.

PHILIP M. CARTER.